April 24, 1945.　　　　G. L. FREAR　　　　2,374,188
OXIDIZING PHOSPHORUS
Filed Dec. 30, 1940　　　3 Sheets-Sheet 1

FIG. I

George L. Frear
INVENTOR
BY Arthur L. Davis
ATTORNEY

Patented Apr. 24, 1945

2,374,188

UNITED STATES PATENT OFFICE 2,374,188

OXIDIZING PHOSPHORUS

George L. Frear, near Sheffield, Ala., assignor to Tennessee Valley Authority, a corporation of the United States of America Application December 30, 1940, Serial No. 372,404

5 Claims. (Cl. 23—165)

(Granted under the act of March 3, 1883, as amended April 30, 1928; 370 O. G. 757)

The invention herein described may be manufactured and used by or for the Government for governmental purposes without the payment to me of any royalty thereon.

This invention relates to a process of oxidizing elemental phosphorus, particularly the preferential oxidation of elemental phosphorus in gaseous mixtures containing carbon monoxide.

In the oxidation of elemental phosphorus contained in phosphate reduction furnace gas it has become customary to oxidize all or at least a substantial proportion of the carbon monoxide contained therein in order to completely recover the phosphorus in its highest state of oxidation, namely, as phosphorus pentoxide. It has long been recognized as desirable to oxidize only the elemental phosphorus in such a gaseous mixture in order that the carbon monoxide may be available for various uses in the arts rather than to have it burned with the production of heat under conditions such that the heat may not be readily utilized.

Consequently, it has been proposed that only the elemental phosphorus in a phosphate reduction furnace gas be oxidized, and the oxidized phosphorus be removed therefrom with the recovery of all of the carbon monoxide therein. Likewise, numerous proposals have been made directed toward the complete oxidation of all of the elemental phosphorus and only a part of the carbon monoxide in such a gas, but, as in the case of the first proposal referred to above, none of the conditions necessary for effecting the complete oxidation of the elemental phosphorus and the minimum oxidation of the carbon monoxide have been disclosed. It has also been proposed to burn a part of the elemental phosphorus in such a gaseous mixture for the purpose of superatmospheric temperature control but such a proposal has no relevance to the complete oxidation of phosphorus which is at the same time preferential as far as the oxidation of carbon monoxide associated therewith is concerned.

The principal object of the present invention is to provide a method for the complete oxidation of the elemental phosphorus in a gaseous mixture containing elemental phosphorus and carbon monoxide without simultaneously oxidizing any substantial portion of such carbon monoxide. Another object of this invention is to provide a method for treating phosphate reduction furnace gas whereby the carbon monoxide therein may be conserved. Other objects of this invention include the provision of a method for the oxidation of the elemental phosphorus associated with carbon monoxide under conditions such that the phosphorus pentoxide obtained may be readily recovered.

I have discovered a process of preferentially oxidizing phosphorus in the presence of substantial proportions of carbon monoxide by forming a uniform gaseous mixture of said elemental phosphorus and carbon monoxide with an oxygen-containing gas, by heating said gaseous mixture uniformly to a temperature of the order of 500° C. and maintaining said temperature for a sufficient length of time to oxidize substantially all of the phosphorus to phosphorus pentoxide and not more than a small proportion of the carbon monoxide in said mixture, and by separating the phosphorus pentoxide therefrom.

In the accompanying drawings which form a part of the specification

Fig. 1 shows, respectively, the relationship for per cent elemental phosphorus oxidized by oxygen to produce phosphorus pentoxide as a function of temperature, the relationship for per cent carbon monoxide oxidized by oxygen to produce carbon dioxide as a function of temperature; the relationship for per cent elemental phosphorus oxidized by carbon dioxide to produce phosphorus pentoxide as a function of temperature; and conversely from the latter, the relationship for per cent of phosphorus pentoxide reduced by carbon monoxide as a function of temperature; with each relationship being an approximation based on information hitherto available.

Figure 1:
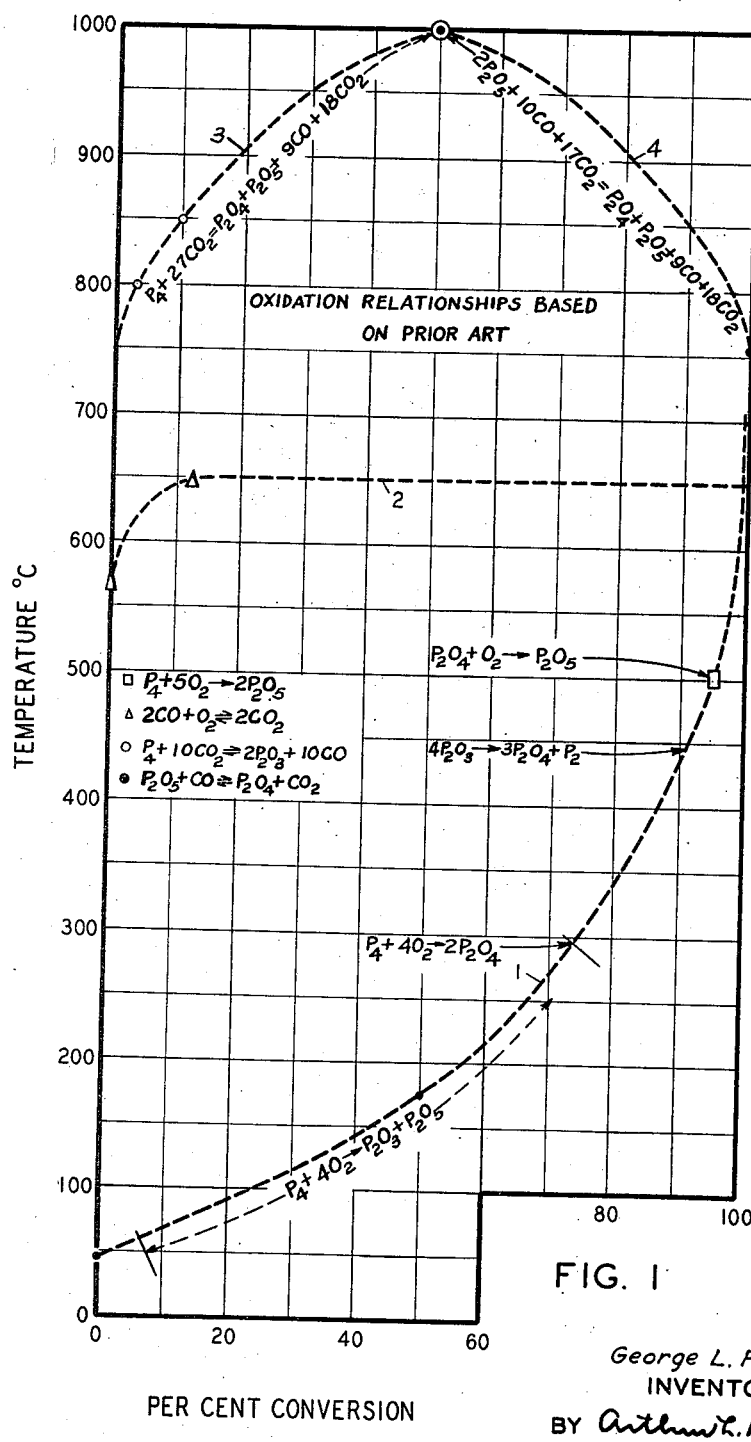

Fig. 1, curve 1 represents the extent of oxidation of elemental phosphorus by oxygen at various temperatures based on source material as follows:

The ignition temperature of phosphorus in air is reported (Mellor, C. T. I. T. C. 8, 772 (1931))

as being about 45° C., that is approximately at the melting point of phosphorus.

At a temperature above 60° C., but presumably below 290° C., where $P_2O_4$ formation was observed, Thorpe and Tutton (J. Chem. Soc. 49, 833–9 (1886)) burned phosphorus in a restricted supply of air and obtained almost as much $P_2O_3$ as $P_2O_5$. Neglecting the probable contamination with unoxidized phosphorus, such an equimolar mixture of $P_2O_3$ and $P_2O_5$ corresponds to the oxidation of 50% of the phosphorus to $P_2O_5$. Taking the temperature of 175° C. midway between 60° and 290° C., it is assumed that the oxidation of phosphorus at this temperature in a restricted supply of air would produce a yield of 50% of the phosphorus so oxidized as phosphorus pentoxide.

$P_2O_3$ also undergoes oxidation on heating at 440° C. yielding $P_2O_4$ as well as red phosphorus (Holleman and Cooper, Textbook of Inorganic Chemistry, 210 (1916)). When heated in air $P_2O_4$ is not oxidized rapidly until a temperature of 500° C. is approached (Emmett and Shultz, Ind. Eng. Chem. 31, 105–111 (1939)). When only the theoretical amount of air to give $P_2O_5$ is used, there will be little oxygen available to complete the oxidation of all of the lower oxides of phosphorus to phosphorus pentoxide at 500° C. Furthermore, the $P_2O_5$ of commerce is usually contaminated with lower oxides (Vanino, Preparative Chemie. 1, 194 (1927)). Hence, the oxidation of phosphorus to phosphorus pentoxide is represented as 95% complete at 500° C. Further heating in the presence of the theoretical amount of oxygen would not be expected to increase the oxidation of the lower oxides of phosphorus to phosphorus pentoxide except insofar as the stability of the lower oxides in the system may be affected by the temperature.

Curve 2 represents the extent of oxidation of carbon monoxide by oxygen at various temperatures since it is known that the oxidation of carbon monoxide starts very slowly at 600° C. and consumes all the free air remaining at 650° C., which is approximately the temperature at which carbon monoxide and oxygen react explosively (Semenoff, Chemical Kinetics and Chain Reactions, 264–79 (1935)).

Curve 3 represents the extent of oxidation of elemental phosphorus by carbon dioxide based on source material as follows:

It has been found (Emmett and Shultz, Ind. Eng. Chem. 31, 105–111 (1939)) that elemental phosphorus is oxidized by carbon dioxide at a measurable rate at 800° C. and that equilibrium is established rapidly at 1000° C. Their data show that the oxidation takes place in the order of 3% at 800° C. and 10% at 850° C. It was found that equilibrium in the carbon monoxide-carbon dioxide-phosphorus tetroxide-phosphorus pentoxide system at about 1000° C. is such that with equal molal quantities of the pentoxide and tetroxide present the ratio of carbon monoxide to carbon dioxide is about 1 to 2. Thus, starting from a mixture of 1 mol of phosphorus vapor and 27 mols of carbon dioxide, the equilibrium proportions would be approximately 1 mol of phosphorus tetroxide ($P_2O_4$), 1 mol of phosphorus pentoxide ($P_2O_5$), 9 mols of carbon monoxide, and 18 mols of carbon dioxide. One-half of the original phosphorus in this mixture is oxidized completely to phosphorus pentoxide, whereas the other half of the phosphorus is oxidized to phosphorus tetroxide.

The reverse reaction, namely, the reduction of phosphorus pentoxide by carbon monoxide has been assumed to begin at 800° C. and such an assumption has been verified experimentally. In view of its relation in the consideration of the present invention the extent of reduction of phosphorus pentoxide by carbon monoxide as a function of temperature is represented in curve 4 as complementary to curve 3. Curve 4 starts at the same temperature as curve 3 and reaches the same equilibrium composition at 1000° C. The initial composition for this reduction reaction is 2 mols of phosphorus pentoxide ($P_2O_5$), 10 mols of carbon monoxide, and 17 mols of carbon dioxide.

Figure 2:
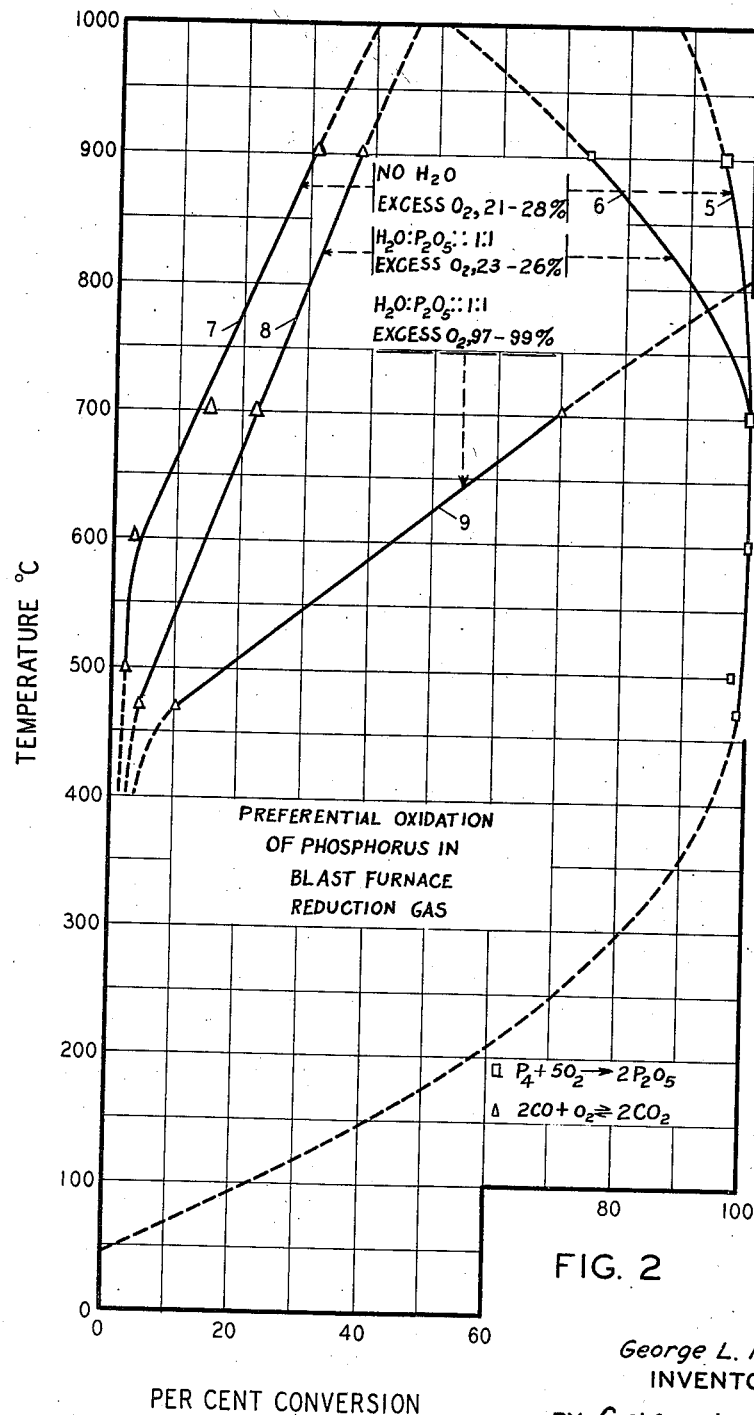
Fig. 2 shows, respectively, the relationship for per cent elemental phosphorus oxidized to produce phosphorus pentoxide as a function of temperature and the relationship for per cent carbon monoxide oxidized to carbon dioxide as a function of temperature when phosphate reduction furnace gases, produced in an electric furnace, are oxidized by air admixed therewith.

In Fig. 2, curve 5 shows the extent of oxidation of elemental phosphorus in phosphate reduction furnace gas, produced in an electric furnace, by air mixed therewith but in the absence of water vapor, while curve 6 shows the same effect in the presence of water vapor. Curve 7 shows the extent of oxidation of carbon monoxide in the same gaseous mixture as represented by curve 5 wherein the excess of air was 21 to 28%. Curve 8 shows the extent of the oxidation of carbon monoxide in the gaseous mixture corresponding to curve 6 wherein the excess of air is 23 to 26%. Curve 9 shows the extent of oxidation of carbon monoxide in such a mixture in the presence of water wherein the excess of air is 97 to 99%.

Figure 3:
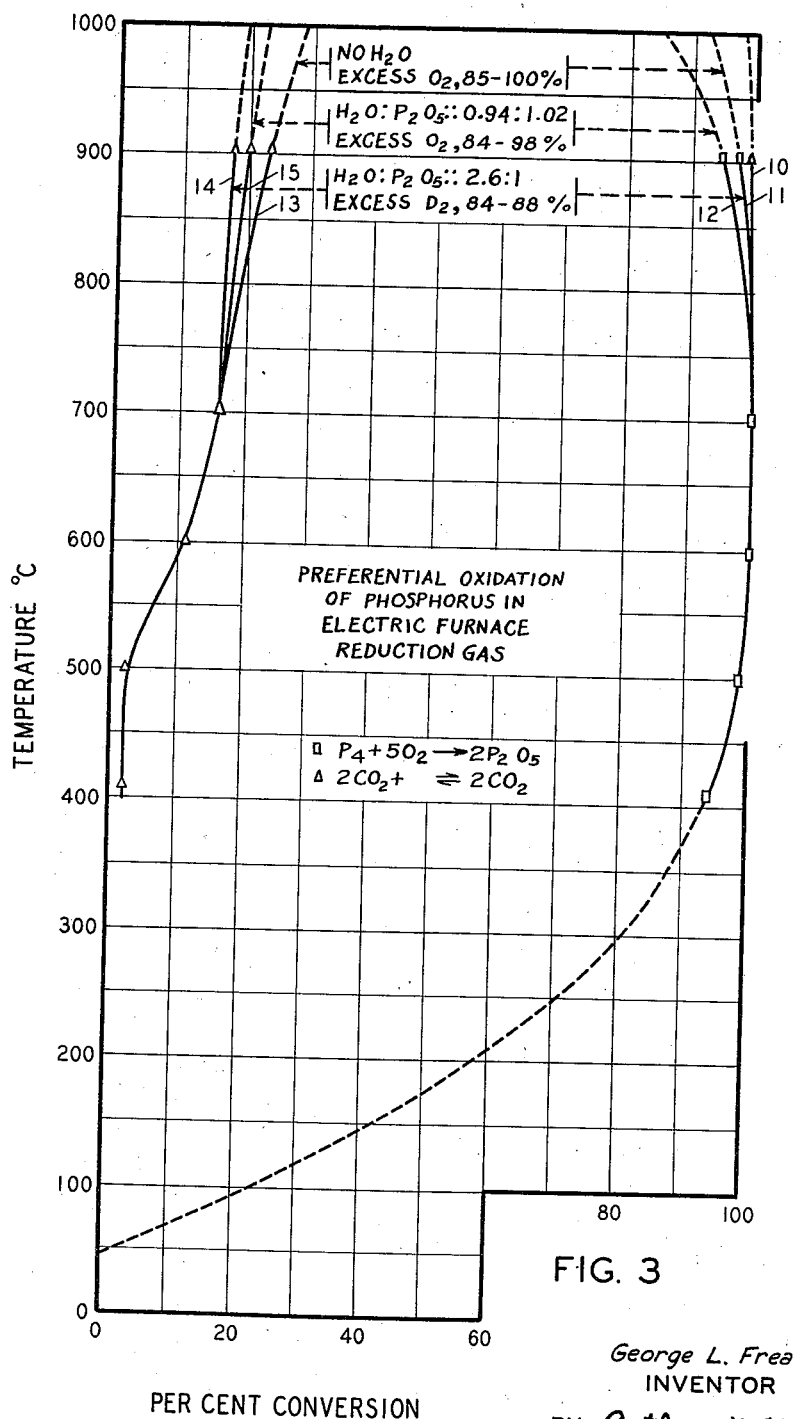
Fig. 3 shows, respectively, the relationship for per cent elemental phosphorus oxidized to produce phosphorus pentoxide as a function of temperature and the relationship for per cent carbon monoxide oxidized to carbon dioxide as a function of temperature when phosphate reduction furnace gases, produced in a blast furnace, are oxidized by air admixed therewith.

In Fig. 3, curve 10 shows the extent of oxidation of elemental phosphorus in a phosphate reduction furnace gas, produced in a blast furnace, by air mixed therewith in the absence of water vapor. Curves 11 and 12 show the same effect in the presence of water vapor. Curve 13 shows the extent of oxidation of carbon monoxide in the gaseous mixture corresponding to curve 10 wherein the excess of air is 85 to 100%. Curve 14 shows the extent of oxidation of carbon monoxide in the gaseous mixture corresponding to curve 11 wherein the excess of air is 84 to 88% and curve 15 shows the extent of the oxidation of carbon monoxide in the gaseous mixture corresponding to curve 12 wherein the excess air is 84 to 98%.

One example for the operation of the present invention is given for the preferential oxidation of elemental phosphorus in a phosphate furnace gas from an electric furnace. A mixture of the electric furnace gas and air was made by admitting 202 cubic feet of air into 94 cubic feet of the furnace gas per hour per cubic foot of enclosed oxidation zone just prior to the admission of the gas into said zone. The temperature within the zone was indicated by a thermocouple and maintained constant at 436° C. by admitting atomized water into the air as it was admixed with the gas, the amount of water being regulated by a magnetic valve in the conduit supplying the water, actuated by the thermocouple in the oxidation zone. An analysis of reaction products leaving the zone showed a conversion of 99.96 per cent of the elemental phosphorus admitted thereto into phosphorus pentoxide and a conversion of 5.8 per cent of the carbon monoxide to carbon dioxide. The above operation corresponds to the oxidation of 2.3 pounds of elemental phosphorus per hour per cubic foot of space in the enclosed zone or 6.7 cubic feet of elemental phosphorus vapor per hour per cubic foot of enclosed zone and the amount of air corresponds to 129 per cent of the theoretical amount of oxygen required for the oxidation of the elemental phosphorus in the electric furnace gas to phosphorus pentoxide.

Another example for the operation of the present invention is given for the oxidation of elemental phosphorus in phosphate reduction furnace gas from a blast furnace. A mixture of the blast furnace gas was made by admitting 237 cubic feet of air into 945 cubic feet of the furnace gas per hour per cubic foot of enclosed oxidation zone just prior to the admission of gas into said zone. The temperature within the zone was indicated by thermocouple and maintained at 577° C. by admitting atomized water into the air after it was admixed with the gas, the amount of water being regulated by a magnetic valve in the conduit supplying the water, actuated by the thermocouple in the oxidation zone. An analysis of a reaction product leaving the zone showed a conversion of 100% of the elemental phosphorus admitted thereto into phosphorus pentoxide and a conversion of 4.7 per cent of the carbon monoxide into carbon dioxide. The above operation corresponds to the oxidation of 2.3 pounds of elemental phosphorus per hour per cubic foot of space in the enclosed zone or 6.7 cubic feet of elemental phosphorus vapor per hour per cubic foot of enclosed zone and the amount of air corresponds to 148 per cent of the theoretical amount of oxygen required for the oxidation of elemental phosphorus in the blast furnace gas to phosphorus pentoxide.

It is evident that there are numerous factors which will influence conditions for the most satisfactory operation of the present invention the actual limits of which cannot be established except by a specific application to each raw material, the specific apparatus used and the character of the final products required.

This invention is directed primarily to the preferential oxidation of elemental phosphorus in phosphate reduction furnace gases such as produced either in an electric furnace or in a blast furnace. The invention is, however, not limited to application with gases which alone have compositions typical of electric furnace or blast furnace gas. In other words, a small or substantial portion of the elemental phosphorus may be condensed from an electric furnace gas and the residual gas therefrom treated to obtain a preferential oxidation of the phosphorus remaining therein.

Air is the oxygen-containing gas most readily adaptable and ordinarily used for the purpose of oxidizing elemental phosphorus. The amount of air used should in any event correspond to the theoretical oxygen requirement for combining with all of the elemental phosphorus to form phosphorus pentoxide and, in order that the reaction may be carried to completion at a practical rate, it is desirable to have a small excess of oxygen above that theoretically required. However, in the case of the oxidation of phosphorus in electric furnace gas, this excess of oxygen should not exceed 50 per cent of theory while in the blast furnace gas this excess should not exceed 250 per cent of theory. Experience to date indicates that an excess of 20 to 40 per cent of oxygen is preferable when using electric furnace gas and an excess of 50 to 100 per cent is preferable when using blast furnace gas.

The gas containing elemental phosphorus and the required amount of air is uniformly mixed at a regulated rate and passed into an enclosed zone where the mixture is maintained at a predetermined temperature. Since the reaction between the elemental phosphorus and oxygen is exothermic, provision must be made to remove heat in order that such regulated temperature will not be exceeded. This may be accomplished by the indirect cooling of the enclosed zone, by returning some of the residual gas from the exit of the enclosed zone into the inlet of the enclosed zone after the phosphorus pentoxide therein has been removed and the residual gas cooled somewhat, or by atomizing the cooling liquid into the inlet of the enclosed zone thereby utilizing its latent heat of vaporization. This latter method of cooling is particularly adaptable in this instance through the use of water as the presence of water in vapor form is in certain instances desirable for combination with the phosphorus pentoxide in order that the hydrated phosphorus pentoxide may be separated from the effluent gas as phosphoric acid. The amount of water required will depend not only upon the thermal characteristics of the apparatus used but the temperature which is maintained in the enclosed oxidation zone with lower temperatures requiring the use of more water than that required at a higher temperature. Amounts of water between 4.5 and 12 pounds per pound of phosphorus oxidized have been used satisfactorily for this purpose.

The temperature which is required to be maintained in the enclosed oxidation zone is of the order of 500° C. The application of such a temperature makes it possible to obtain a substantially complete oxidation of all of the phosphorus to phosphorus pentoxide and still have only a very small proportion of the carbon monoxide associated therewith oxidized to carbon dioxide. The optimum temperature will vary somewhat depending upon the character of the mixture in which the oxidation takes place, with the higher concentration of elemental phosphorus in such a mixture requiring a slightly lower temperature than that required where the gaseous mixture contains a very small proportion of elemental phosphorus such as that existing when blast furnace gas is mixed with the requisite amount of air. The oxidation of phosphorus in such a gaseous mixture begins to take place readily at temperatures as low as 200° C., and increases rapidly to temperatures of the order of 700 to 800° C. At temperatures above 500° C. not only is the phosphorus oxidized but the carbon monoxide oxidation increases to an appreciable rate by the time temperatures reach 800° C, and in addition to the increased rate of oxidation of carbon monoxide, there appears to be an appreciable reduction of the phosphorus pentoxide formed by the carbon monoxide present. Therefore, it appears that while the temperature of the order of 500° C. is generically critical, a temperature between 400 and 500° C. is preferable where high concentration of elemental phosphorus is present such as in gaseous mixtures produced by the use of electric furnace gas while temperatures of the order of 450 to 550° C. are preferable when using gaseous mixtures of lower concentration of elemental phosphorus such as obtained by the use of gas of the character of blast furnace gas.

It is particularly important that the rate of passage through the enclosed oxidation zone of the gaseous mixture being oxidized be regulated. Results available at present indicate that not more than 2.5 pounds of elemental phosphorus per hour per cubic foot of enclosed space should be employed to obtain substantially complete conversion of elemental phosphorus to phosphorus pentoxide and at the same time effect no substantial oxidation of the carbon monoxide associated therewith. Expressed in other terms, this corresponds to 7 cubic feet of elemental phosphorus vapor per hour per cubic foot of enclosed zone or the passage of a mixture of electric furnace gas containing 7 per cent elemental phosphorus and air containing a 50 per cent excess oxygen at the rate of 350 cubic feet of the mixture per hour per cubic foot of enclosed zone or a mixture of blast furnace gas containing 0.7 per cent of elemental phosphorus and air containing a 200 per cent excess of oxygen at the rate of 1500 cubic feet per hour per cubic foot of space in the enclosed oxidation zone. The volumes referred to are on the standard temperature and pressure basis.

A study of the preferential oxidation of elemental phosphorus in mixtures containing a considerable proportion of carbon monoxide has been made over a considerable range of conditions, including a considerable temperature range, various amounts of excess oxygen in the oxygen-containing gas used and varying amounts of water vapor present. To show both the extent of oxidation of phosphorus to phosphorus pentoxide and the corresponding extent of oxidation of carbon monoxide to carbon dioxide, examples of the results obtained using electric furnace gas under specific conditions are shown in Table 1 and illustrated in Fig. 2.

*Table 1—Oxidation of elemental phosphorus and carbon monoxide in electric furnace gas as a function of temperature*

| Curve number | Temperature hot zone, °C. | Percent theoretical | | Oxidation to $P_2O_5\%$ | CO oxidized to $CO_2\%$ | Exit gas, volume percent | |
| --- | --- | --- | --- | --- | --- | --- | --- |
| | | Air to give $P_2O_5$ | $H_2O$ to form $HPO_3$ | | | CO | $O_2$ |
| 5 and 7 | 500 | 121 | 0 | 98.1 | 2.2 | 32.9 | 4.1 |
| Do | 601 | 128 | 0 | 99.8 | 3.5 | 30.0 | 4.5 |
| Do | 702 | 122 | 0 | 100.0 | 14.6 | 28.7 | 0.9 |
| Do | 901 | 125 | 0 | 95.0 | 31.0 | 23.3 | 0.4 |
| 6 and 8 | 472 | 126 | 102 | 98.7 | 4.3 | 32.8 | 3.6 |
| Do | 701 | 124 | 102 | 100.0 | 22.4 | 26.4 | 0.0 |
| Do | 903 | 123 | 101 | 74.0 | 38.0 | 21.2 | 0.1 |
| 6 and 9 | 470 | 199 | 102 | 99.6 | 10.1 | 19.6 | 5.5 |
| Do | 702 | 197 | 100 | 100 | 70.0 | 7.6 | 1.3 |

Other examples of the results obtained using blast furnace gas under specific conditions are shown in Table 2 and illustrated in Fig. 3.

*Table 2—Oxidation of elemental phosphorus and carbon monoxide in blast furnace gas as a function of temperature*

| Curve number | Temperature hot zone, °C. | Percent theoretical | | Oxidation to $P_2O_5\%$ | CO oxidized to $CO_2\%$ | Exit gas, volume percent | |
| --- | --- | --- | --- | --- | --- | --- | --- |
| | | Air to give $P_2O_5$ | $H_2O$ to form $HPO_3$ | | | CO | $O_2$ |
| 10 and 13 | 704 | 185 | 0 | 100 | 15.4 | 23.4 | 0.9 |
| Do | 903 | 200 | 0 | 99.2 | 23.9 | 20.6 | 0.2 |
| 11 and 14 | 707 | 188 | 265 | 100 | 17.1 | 22.7 | 0.3 |
| Do | 904 | 184 | 261 | 97.2 | 17.8 | 22.8 | 0.6 |
| 12 and 15 | 411 | 198 | 102 | 93.6 | 2.2 | 28.0 | 2.3 |
| Do | 501 | 191 | 95 | 99.8 | 2.2 | 27.0 | 1.8 |
| Do | 501 | 189 | 96 | 99.7 | 2.4 | 23.9 | 2.4 |
| Do | 601 | 196 | 101 | 100 | 11.6 | 24.8 | 1.4 |
| Do | 703 | 194 | 99 | 100 | 16.3 | 24.0 | 0.5 |
| Do | 904 | 184 | 94 | 94.8 | 20.0 | 23.4 | 0.4 |

It will be seen, therefore, that this invention actually may be carried out by the use of various modifications and changes without departing from its spirit or scope, with only such limitations placed thereon as may be imposed by the prior art.

I claim:

1. A process of preferentially oxidizing all of the elemental phosphorus and not more than a small proportion of the carbon monoxide in a phosphate reduction furnace gas from an electric furnace containing in the order of 7 to 8 per cent elemental phosphorus vapor which comprises (a) forming a uniform gaseous mixture of said electric furnace gas and an amount of air containing an excess but not more than 50 per cent excess of oxygen required to combine with the elemental phosphorus to form phosphorus pentoxide; and (b) maintaining said gaseous mixture uniformly at a temperature of about 500° C.

2. A process of preferentially oxidizing all of the elemental phosphorus and not more than a small proportion of the carbon monoxide in a phosphate reduction furnace gas from a blast furnace containing in the order of 0.7 to 0.8% of elemental phosphorus which comprises (a) forming a uniform gaseous mixture of said blast furnace gas and an amount of air containing a substantial excess but not more than 250 per cent excess of oxygen required to combine with the elemental phosphorus to form phosphorus pentoxide; and (b) maintaining said gaseous mixture uniformly at a temperature of about 500° C. for a sufficient length of time to oxidize substantially all of the phosphorus to phosphorus pentoxide and not more than a small proportion of the carbon monoxide in said mixture.

3. A process of preferentially oxidizing all of the elemental phosphorus and not more than a small proportion of the carbon monoxide in a phosphate reduction furnace gas from an electric furnace containing of the order of 7 to 8 per cent elemental phosphorus which comprises (a) forming a uniform gaseous mixture of said electric furnace gas and an amount of air containing approximately 20 to 40 per cent excess of the amount of oxygen required for the conversion of the phosphorus therein to phosphorus pentoxide, (b) passing said gaseous mixture through an enclosed zone at a rate up to approximately 350 cubic feet per hour per cubic foot of space in said zone, and (c) maintaining said gaseous mixture in said zone uniformly at a temperature between 400 and 500° C.

4. A process of preferentially oxidizing all of the elemental phosphorus and not more than a small proportion of the carbon monoxide in a phosphate reduction furnace gas from a blast furnace containing of the order of 0.7 to 0.8% of elemental phosphorus which comprises (a) forming a uniform gaseous mixture of said blast furnace gas and an amount of air containing approximately 50 per cent excess of the amount of oxygen required for the conversion of the phosphorus therein to phosphorus pentoxide, (b) passing said gaseous mixture through an enclosed zone at a rate up to approximately 1250 cubic feet per hour per cubic foot of space in said zone, and (c) maintaining said gaseous mixture in said zone uniformly at a temperature between 450 and 550° C.

5. A process of preferentially oxidizing phosphorus in gaseous mixture containing a substantial proportion of carbon monoxide which comprises (a) forming a uniform gaseous mixture of said elemental phosphorus and carbon monoxide with an oxygen containing gas to supply oxygen in substantial excess of the oxygen required to combine with the elemental phosphorus therein to form phosphorus pentoxide, and (b) maintaining said gaseous mixture uniformly at a temperature between 400 and 600° C.

GEORGE L. FREAR.